July 20, 1926.
C. H. KNUDSEN
VALVE CONSTRUCTION FOR FUEL OIL MOTORS
Original Filed April 21, 1922
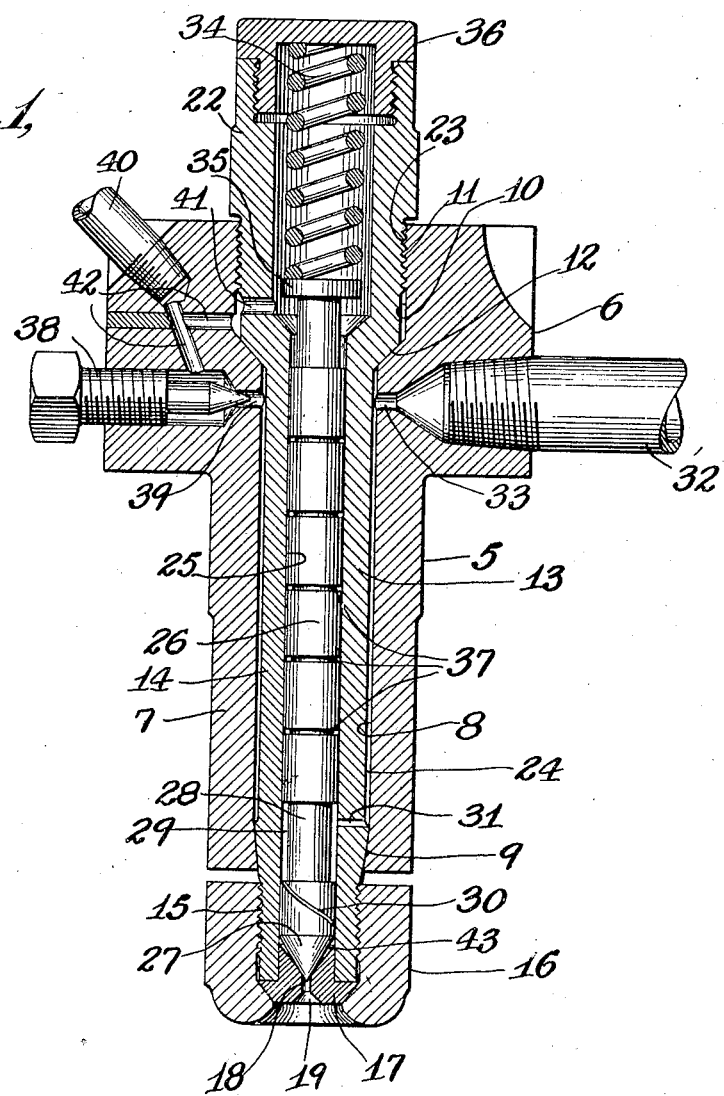
Fig.1,
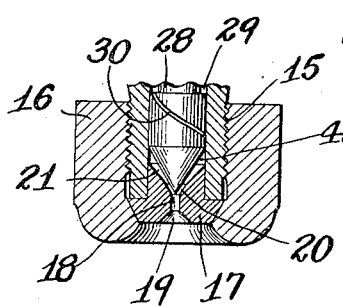
Fig.2,
Inventor
Carl H. Knudsen
By his Attorneys
Edgar Tate & Co.

Patented July 20, 1926.

1,593,023

UNITED STATES PATENT OFFICE.

CARL H. KNUDSEN, OF BROOKLYN, NEW YORK, ASSIGNOR TO THE KNUDSEN MOTOR CORPORATION, OF WILMINGTON, DELAWARE, A CORPORATION OF DELAWARE.

VALVE CONSTRUCTION FOR FUEL-OIL MOTORS.

Application filed April 21, 1922, Serial No. 555,832. Renewed October 15, 1925.

This invention relates to valve constructions and particularly to devices of this class designed for use in connection with what are known as fuel oil engines or motors, and the object of the invention is to provide a device of the class specified into which fuel oil under pressure is adapted to be passed, said device being provided with means for discharging air therefrom; a further object being to provide an automatically operated valve for controlling the discharge of oil from said valve device into the cylinder or cylinders of an engine; and with these and other objects in view the invention consists in a device of the class and for the purpose specified which is simple in construction and operation and efficient in use, and which is constructed as hereinafter described and claimed.

The invention described and claimed herein is an improvement on that shown, described and claimed in a prior patent granted to me December 28, 1920, No. 1,363,470, and is fully disclosed in the following specification, of which the accompanying drawing forms a part, in which the separate parts of my improvement are designated by suitable reference characters in each of the views, and in which:—

Fig. 1 is a sectional view of my improved valve device showing the parts in a normal position; and, Fig. 2 a sectional detail view of the discharge end of the valve device showing a part in a different position.

In the drawing I have shown at 5 the main body of the valve device which, in the construction shown, comprises an enlarged head portion 6 and a depending sleeve portion 7. The bore 8 of the sleeve portion 7 is tapered inwardly at the base thereof as shown at 9 and said bore extends into the head 6 and is enlarged as shown at 10 and threaded as shown at 11 and joining the enlargement 10 in the bore 8 proper is a beveled seat 12. Detachably mounted in the body 5 or the bore 8 thereof is a supplemental body portion 13 comprising a sleeve portion 14 which is tapered adjacent to the lower end thereof to cooperate with the seat 9, and said end is externally threaded as shown at 15 to receive a cap-shaped sleeve 16 which supports a discharge nozzle 17 and holds the same in connection with the end of the sleeve 14; said nozzle being provided with a small discharge aperture 18 which flares outwardly as shown at 19 and is provided with an upwardly flared portion provided with a conical valve seat 20 and an enlarged beveled portion 21. The upper end of the sleeve 14 is enlarged as shown at 22 and is threaded as shown at 23 to cooperate with the threads 11 of the head 6 and the enlargement 22 is beveled to cooperate with the seat 12 in the bore 10, the outside diameter of the sleeve 14 between the seats 9 and 12 is less than the diameter of the bore 8 thus forming an annular chamber 24 around the sleeve 14.

Mounted in the bore 25 of the sleeve 14 is an automatically operated valve rod 26, the lower end of which is conical in form as shown at 27 and adapted to cooperate with the seat 20 in the discharge nozzle 17, and the valve rod adjacent to its lower end is reduced as shown at 28 to form a chamber 29 in the bore 25 of the sleeve 14 around said reduced portion, and the valve rod 26 below the reduced portion or between said reduced portion and the conical end is provided with a spiral groove or grooves 30 and an aperture 31 in the sleeve 14 places the chambers 24 and 29 in communication.

Connected with the head 6 of the main body portion 5 is a high pressure oil supply pipe 32 which is in communication with the chamber 24 through an aperture 33, whereby oil under pressure may be passed into the chamber 24 through the aperture 31 into the chamber 29 through the groove or grooves 30 and out through the discharge nozzle 17, or the aperture 18 therein, in which operation the valve rod 26 is automatically raised by the pressure of such oil against the tension of a spring 34 cooperating with the head 35 of said valve rod, said spring being mounted in the enlargement 22 of the sleeve 14 and being held in place by a removable cap 36 mounted in connection with the enlargement 22.

The shank of the valve rod 26 between the head end and reduced portion theerof is provided with a plurality of circumferential grooves 37 into which oil is adapted to pass to form a seal for said valve rod and to lubricate said rod at all times.

Mounted in the head 6 of the main body 5 of the valve device is an air discharge valve 38 which cooperates with and controls an aperture 39 communicating with the chamber 24, and a pipe 40 is connected with the head 6 and placed in communication with the upper end of the bore 25 through an aperture 41 as well as through other apertures 42.

It will be understood that my improved valve device is mounted in connection with the cylinder of a fuel oil engine or motor in the usual or any desired manner, and means cooperating with the crank shaft of the engine is employed for forcing oil under pressure into the chamber 24 at the proper time or at the end of the compression stroke, and the oil under pressure will pass downwardly through the chamber 24 into the chamber 29 through the aperture 31 through the groove 30 downwardly into an annular chamber 43 between the conical end 27 of the valve rod and the taper 21 of the discharge nozzle, and the pressure of oil will automatically raise said valve rod against the tension of the spring 34 into a position approximately similar to that shown in Fig. 2 of the drawing to permit the discharge of oil through the aperture 18 of the nozzle 17 and into the cylinder of the engine, and when the pressure is relieved on the oil the valve rod will return to its normal or seated position by the action of the spring 34, in other words, the valve rod is intermittently and automatically operated to open and close the discharge of the nozzle 17 by the pressure of oil introduced into said valve device in the manner above set out.

In starting the motor or engine, it will be necessary to open the air valve 38 to permit the discharge of air from the chamber 24, and after this air has been discharged and the oil has reached an approximate level corresponding to the aperture 33 or in line therewith, the air valve 38 is closed and the valve device is ready for operation. It will also be apparent that in the event of an overflow of oil, or the feeding of oil upwardly into the enlargement of the bore 25, said oil will feed through the apertures 41 and 42 and out through the discharge pipe 40 which will be placed in communication with an oil reservoir.

It will also be apparent that the discharge nozzle 17 is made separate and may thus be removed at will and a new nozzle substituted whenever desired, and the tension of the spring 34 will be such as to properly control the action of the valve rod 26 at all times, and while I have shown certain details of construction for carrying my invention into effect, it will be apparent that I am not necessarily limited to these details, and various changes therein and modifications thereof may be made, within the scope of the appended claims, without departing from the spirit of my invention or sacrificing its advantages.

Having fully described my invention, what I claim as new and desire to secure by Letters Patent, is:—

1. A device of the class described comprising a main casing, a supplemental casing mounted in the main casing and projecting through one end of the main casing, an elongated annular fuel chamber formed between said main and supplemental casing, said chamber being sealed at both ends, a valve element mounted in the supplemental casing, a discharge nozzle at the protruding end portion of said supplemental casing and in connection with which said valve element operates, and means for admitting fuel under pressure into the upper end portion of said fuel chamber.

2. A device of the class described comprising a main casing, a supplemental casing mounted in the main casing and projecting through one end of the main casing, an elongated annular fuel chamber formed between said main and supplemental casing, said chamber being sealed at both ends, a valve elment mounted in the supplemental casing, a discharge nozzle at the protruding end portion of said supplemental casing and in connection with which said valve element operates, means for admitting fuel under pressure into the upper end portion of said fuel chamber, and means for placing said fuel chamber in communication with the nozzle, said communication being controlled by said valve element.

3. A device of the class described comprising a main casing, a supplemental casing mounted in the main casing and projecting through one end of the main casing, an elongated annular fuel chamber formed between said main and supplemental casing, said chamber being sealed at both ends, a valve element mounted in the supplemental casing, a discharge nozzle at the protruding end portion of said supplemental casing and in connection with which said valve element operates, means for admitting fuel under pressure into the upper end portion of said fuel chamber, means for placing said fuel chamber in communication with the nozzle, said communication being controlled by said valve element, means for normally holding said valve element seated in said nozzle and whereby the pressure of fuel will operate to automatically move said valve into position to permit of the discharge of fuel through said nozzle.

4. A device of the class described comprising a main casing, a supplemental casing mounted in the main casing and projecting through one end of the main casing, an elongated annular fuel chamber formed between said main and supplemental casing, said chamber being sealed at both ends, a valve element mounted in the supplemental casing, a discharge nozzle at the protruding end portion of said supplemental casing and in connection with which said valve element operates, means for admitting fuel under pressure into the upper end portion of said fuel chamber, means for placing said fuel chamber in communication with the nozzle, means for normally holding said valve element seated in said nozzle and whereby the pressure of fuel will operate to automatically move said valve into position to permit of the discharge of fuel through said nozzle, said nozzle being detachably mounted in connection with the supplemental casing, and an adjustable air valve in communication with the upper end of said fuel chamber.

5. A device of the class described comprising a main casing having a bore extending longtudinally therethrough and beveled seats at the opposite end portions of the bore, a supplemental casng mounted in the main casing and forming an elongated annular fuel chamber therebetween, said supplemental casing having beveled portions adapted to cooperate with the seats in the main casing to form seals for the opposite ends of said chamber, a tensionally controlled rod-like valve movably mounted in said supplemental casing, a nozzle at one end portion of the supplemental casing and in connection with which said valve operates, and means for placing said nozzle in communication with the lower end portion of said fuel chamber.

6. A device of the class described comprising a main casing having a bore extending longitudinally therethrough and beveled seats at the opposite end portions of the bore, a supplemental casing mounted in the main casing and forming an elongated annular fuel chamber therebetween, said supplemental casing having beveled portions adapted to cooperate with the seats in the main casing to form seals for the opposite ends of said chamber, a tensionally controlled rod-like valve movably mounted in said supplemental casing, a nozzle at one end portion of the supplemental casing and in connection with which said valve operates, means for placing said nozzle in communication with the lower end portion of said fuel chamber, and means for supplying fuel under pressure to the upper end portion of the fuel chamber.

7. A device of the class described comprising a main casing having a bore extending longitudinally therethrough and beveled seats at the opposite end portions of the bore, a supplemental casing mounted in the main casing and forming an elongated annular fuel chamber therebetween, said supplemental casing having beveled portions adapted to cooperate with the seats in the main casing to form seals for the opposite ends of said chamber, a tensionally controlled rod-like valve movably mounted in said supplemental casing, a nozzle at one end portion of the supplemental casing and in connection with which said valve operates, means for placing said nozzle in communication with the lower end portion of said fuel chamber, means for supplying fuel under pressure to the upper end portion of the fuel chamber, and an air valve in communication with the upper end portion of said fuel chamber.

8. A device of the class described comprising a main casing having a bore extending longitudinally therethrough and beveled seats at the opposite end portions of the bore, a supplemental casing mounted in the main casing and forming an elongated annular fuel chamber therebetween, said supplemental casing having beveled portions adapted to cooperate with the seats in the main casing to form seals for the opposite ends of said chamber, a tensionally controlled rod-like valve movably mounted in said supplemental casing, a nozzle at one end portion of the supplemental casing and in connection with which said valve operates, means for placing said nozzle in communication with the lower end portion of said fuel chamber, means for supplying fuel under pressure to the upper end portion of the fuel chamber, an air valve in communication with the upper end portion of said fuel chamber, said nozzle being provided with a tapered seat and the end portion of the valve being conical in form and adapted to rest upon a predetermined portion of the seat to form between the same and said seat, an annular chamber.

9. A device of the class described comprising a main casing having a bore extending longitudinally therethrough and beveled seats at the opposite end portions of the bore, a supplemental casing mounted in the main casing and forming an elongated annular fuel chamber therebetween, said supplemental casing having beveled portions adapted to cooperate with the seats in the main casing to form seals for the opposite ends of said chamber, a tensionally controlled rod-like valve movably mounted in said supplemental casing, a nozzle at one end portion of the supplemental casing and in connection with which said valve operates, means for placing said nozzle in communication with the lower end portion of said fuel chamber, means for supplying fuel under pressure to the upper end portion of the fuel chamber, an air valve in communication with the upper end portion of said fuel chamber, said nozzle being provided with a tapered seat and the end portion of the valve being conical in form and adapted to rest upon a predetermined portion of the seat to form between the same and said seat, an annular chamber, and said valve being provided adjacent to the end portion thereof and on the periphery thereof with a spiral groove for placing said fuel chamber in communication with said last named chamber.

10. A spray valve of the class described comprising a main tubular casing, a supplemental tubular casing mounted within the main casing and forming between said casing, an elongated annular fuel chamber sealed at its opposite ends by beveled seats formed in and between the separate casings, a spray nozzle mounted in connection with the lower end portion of the supplemental casing, said nozzle being provided with a conical seat, a rod-like valve mounted in the bore of the supplemental casing and the end of which is conical in form to seat in said nozzle and form between it and the nozzle, a chamber, said valve being reduced adjacent to the lower end portion thereof to form in said supplemental casing a chamber, means for placing said last named chamber in communication with the chamber between the valve and nozzle, and means for placing the last named chamber in communication with the lower end portion of the fuel chamber.

11. A spray valve of the class described comprising a main tubular casing, a supplemental tubular casing mounted within the main casing and forming between said casing, an elongated annular fuel chamber sealed at its opposite ends by beveled seats formed in and between the separate casings, a spray nozzle mounted in connection with the lower end portion of the supplemental casing, said nozzle being provided with a conical seat, a rod-like valve mounted in the bore of the supplemental casing and the end of which is conical in form to seat in said nozzle and form between it and the nozzle, a chamber, said valve being reduced adjacent to the lower end portion thereof to form in said supplemental casing a chamber, means for placing said last named chamber in communication with the chamber between the valve and nozzle, means for placing the last named chamber in communication with the lower end portion of the fuel chamber, and means for supplying fuel under pressure to the upper end portion of the fuel chamber.

12. A spray nozzle of the class described comprising a main tubular casing, a supplemental tubular casing mounted within the main casing and forming between said casing, an elongated annular fuel chamber sealed at its opposite ends by beveled seats formed in and between the separate casings, a spray nozzle mounted in connection with the lower end portion of the supplemental casing, said nozzle being provided with a conical seat, a rod-like valve mounted in the bore of the supplemental casing and the end of which is conical in form to seat in said nozzle and form between it and the nozzle, a chamber, said valve being reduced adjacent to the lower end portion thereof to form in said supplemental casing a chamber, means for placing said last named chamber in communication with the chamber between the valve and nozzle, means for placing the last named chamber in communication with the lower end portion of the fuel chamber, means for supplying fuel under pressure to the upper end portion of the fuel chamber, a discharge port in communication with the upper end portion of the fuel chamber and an adjustable valve for controlling the communication between said chamber and discharge port.

In testimony that I claim the foregoing as my invention I have signed my name this 19th day of April 1922.

CARL H. KNUDSEN.